(12) United States Patent
Rausch et al.

(10) Patent No.: US 7,733,814 B1
(45) Date of Patent: Jun. 8, 2010

(54) SEPARATION AND COMBINATION OF MULTIPLE CHANNELS IN A BI-DIRECTIONAL TIME-DIVISION COMMUNICATION SYSTEM

(75) Inventors: Walter F. Rausch, Shawnee, KS (US); Harry W. Perlow, Tarpon Springs, FL (US)

(73) Assignee: Clear Wireless LLC

( * ) Notice: Subject to any disclaimer, the term of this patent is extended or adjusted under 35 U.S.C. 154(b) by 256 days.

(21) Appl. No.: 12/122,899

(22) Filed: May 19, 2008

(51) Int. Cl.
*H04J 3/00* (2006.01)
(52) U.S. Cl. .................. 370/280; 370/278; 370/401; 370/442; 370/537; 455/83; 333/1.1
(58) Field of Classification Search .................. 370/280, 370/282, 275–278, 308, 401–405, 537, 535, 370/442, 459, 460, 450–452; 333/202–204, 333/219, 1.1, 15; 455/78–86, 101, 114, 117, 455/50.1, 272, 279.1
See application file for complete search history.

(56) References Cited

U.S. PATENT DOCUMENTS

| | | | |
|---|---|---|---|
| 3,935,549 A | | 1/1976 | Jachowski |
| 4,206,464 A | | 6/1980 | Hirsch |
| 5,896,563 A | * | 4/1999 | Kawanami et al. ............ 455/82 |
| 5,923,647 A | * | 7/1999 | Dolman et al. .............. 370/280 |
| 6,466,773 B1 | | 10/2002 | Johnson |
| 2002/0181831 A1 | * | 12/2002 | Myers et al. .................. 385/15 |
| 2007/0291171 A1 | * | 12/2007 | Neal .......................... 348/487 |
| 2008/0169878 A1 | * | 7/2008 | Resnati et al. ............... 333/1.1 |
| 2009/0092389 A1 | * | 4/2009 | Wei et al. ...................... 398/59 |

* cited by examiner

Primary Examiner—Ricky Ngo
Assistant Examiner—Gary Mui

(57) ABSTRACT

A time-division communication system wirelessly receives a communication signal during receive time periods and wirelessly transfers a communication signal during transmit time periods. These communication signals have multiple receive and transmit channels. The communication system circulates the received communication signal to various filters that pass particular receive channels and that reflect other receive channels back the circulator(s). Eventually, the reflected receive channels circulate to the appropriate filters and are passed. The filters also pass transmit channels to the circulator(s) where they are circulated and reflected until they combine into the transmit communication signal.

20 Claims, 6 Drawing Sheets

SEPARATION AND COMBINATION OF MULTIPLE CHANNELS IN A BI-DIRECTIONAL TIME-DIVISION COMMUNICATION SYSTEM

TECHNICAL BACKGROUND

In a bi-directional communication system, an antenna receives a first communication signal over the air and transfers a second communication signal over the air. The antenna transfers the first communication signal to a base station, and the base station transmits the second communication signal to the antenna. The base station and antenna may also operate in a time-division manner, where the base station and antenna transmit during transmit time periods and receive during receive time periods. These transmit and receive time periods repeatedly alternate over time.

The transmitted and received communications signals may be comprised of multiple frequency channels where one system in the base station transmits and receives over a first frequency channel, and a second system in the base station transmits and receives over a second frequency channel. During transmit time periods, the frequency channels are combined to form the transmitted communication signal. During receive time periods, the frequency channels are separated from the received communication signal. Various devices are used to combine these frequency channels for transmission and separate these frequency channels upon reception. Resonant cavities use wave-guides to combine and separate communication signals. Unfortunately, resonant cavities are relatively large and expensive. Hybrid microwave combiners use couplers and splitters to combine and separate communication signals. Unfortunately, hybrid microwave combiners introduce unacceptable loss and are also relatively expensive.

OVERVIEW

A time-division communication system wirelessly receives a communication signal during receive time periods and wirelessly transfers a communication signal during transmit time periods. These communication signals have multiple receive and transmit channels. The communication system circulates the received communication signal to various filters that pass particular receive channels and that reflect other receive channels back to the circulator(s). Eventually, the reflected receive channels circulate to the appropriate filters and are passed. The filters also pass transmit channels to the circulator(s) where they are circulated and reflected until they combine into the transmit communication signal.

DETAILED DESCRIPTION

The detailed description and associated figures teach the best mode of the invention. The following claims specify the scope of the invention. Note that some aspects of the best mode may not fall within the scope of the invention as specified by the claims. Those skilled in the art will appreciate that the features described below can be combined in various ways to form multiple variations of the invention. As a result, the invention is not limited to the specific examples described below, but only by the claims and their equivalents.

Example #1

Figure 1:
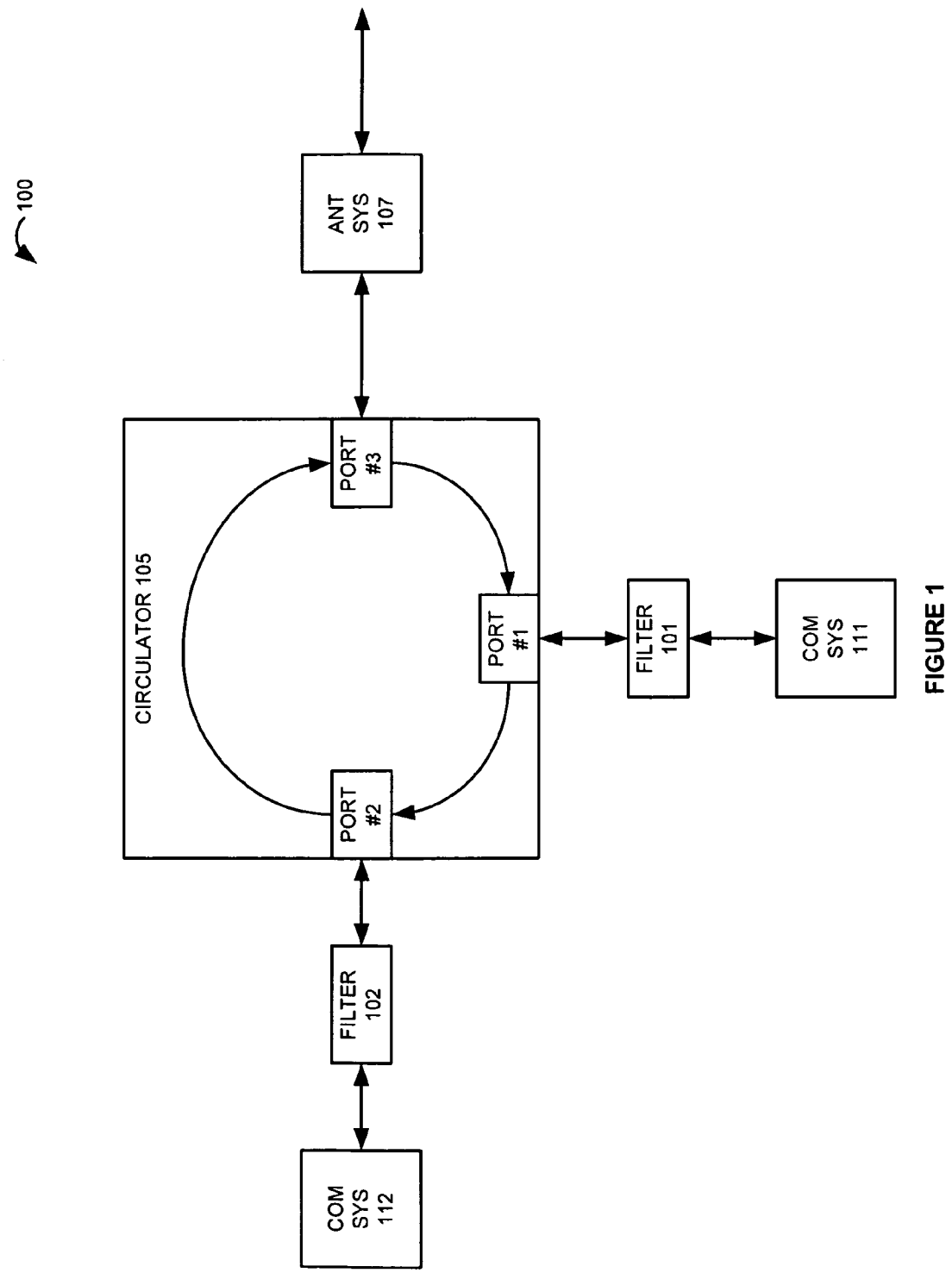
FIG. 1 is a block diagram that illustrates a time-division communication system.

FIG. 1 illustrates time-division communication system 100. Time-division communication system 100 comprises: filters 101-102, circulator 105, antenna system 107, and communication systems 111-112. Communication system 111 is coupled to filter 101, and filter 101 is coupled to port 1 of circulator 105. Communication system 112 is coupled to filter 102, and filter 102 is coupled to port 2 of circulator 105. Antenna system 107 is coupled to port 3 of circulator 105.

Filter 101 comprises a band-pass filter that passes signals in a first frequency band and that blocks (reflects) signals in other frequency bands. Filter 102 comprises a band-pass filter that passes signals in a second frequency band and that blocks (reflects) signals in other frequency bands. Filters 101-102 effectively present low impedance to passed signals and high impedance to reflected signals. Although various frequency configurations could be used, the first frequency band and the second frequency band could be non-adjacent frequency bands or they could be adjacent frequency bands that are separated by a smaller unused guard frequency band. The frequency bands could be 10 MHz wideband channels.

Circulator 105 includes port 1, port 2, and port 3. Circulator 105 may include additional ports although they are not required. Circulator 105 could be a magnetic circulator. Signals that enter circulator 105 through port 1 exit circulator 105 through port 2. Signals that enter circulator 105 through port 2 exit circulator 105 through port 3. Signals that enter circulator 105 through port 3 exit circulator 105 through port 1.

Antenna system 107 comprises an antenna and possibly other components, such as an amplifier, filter, signal processor, or some other communication equipment. Antenna system 107 wirelessly receives and transmits communication signals over the air. Antenna system 107 exchanges the communication signals with port 3 of circulator 105.

Communication system 111 comprises a base station, switching system, router, or some other communication equipment. Communication system 111 operates in a time-division fashion that alternates between repeating receive and transmit time periods. During the receive time periods, communication system 111 receives a receive channel in the first frequency band from filter 101. During the transmit time periods, communication system 111 transmits a transmit channel in the first frequency band to filter 101.

Communication system 112 comprises a base station, switching system, router, or some other communication equipment. Communication system 112 operates in a time-division fashion that alternates between repeating receive and transmit time periods. During the receive time periods, communication system 112 receives a receive channel in the second frequency band from filter 102. During the transmit time periods, communication system 112 transmits a transmit channel in the second frequency band to filter 102.

Communication systems 111-112 use the same receive and transmit time periods. Thus, communication systems 111-112 both transmit channels during the transmit time periods and they both receive channels during the receive time periods. These multiple receive channels must be separated for delivery to each system, and the transmit channels from each system must be combined for wireless transmission. The receive and transmit time periods alternate—possibly separated by a relatively small unused time period. Communication systems 111-112 could be integrated together or distributed among multiple components. Communication systems 111-112 may receive and transmit Wireless Interoperability for Microwave Access (WiMAX) communication signals. Communication systems 111-112 may receive and transmit using other synchronized protocols.

Figure 2:
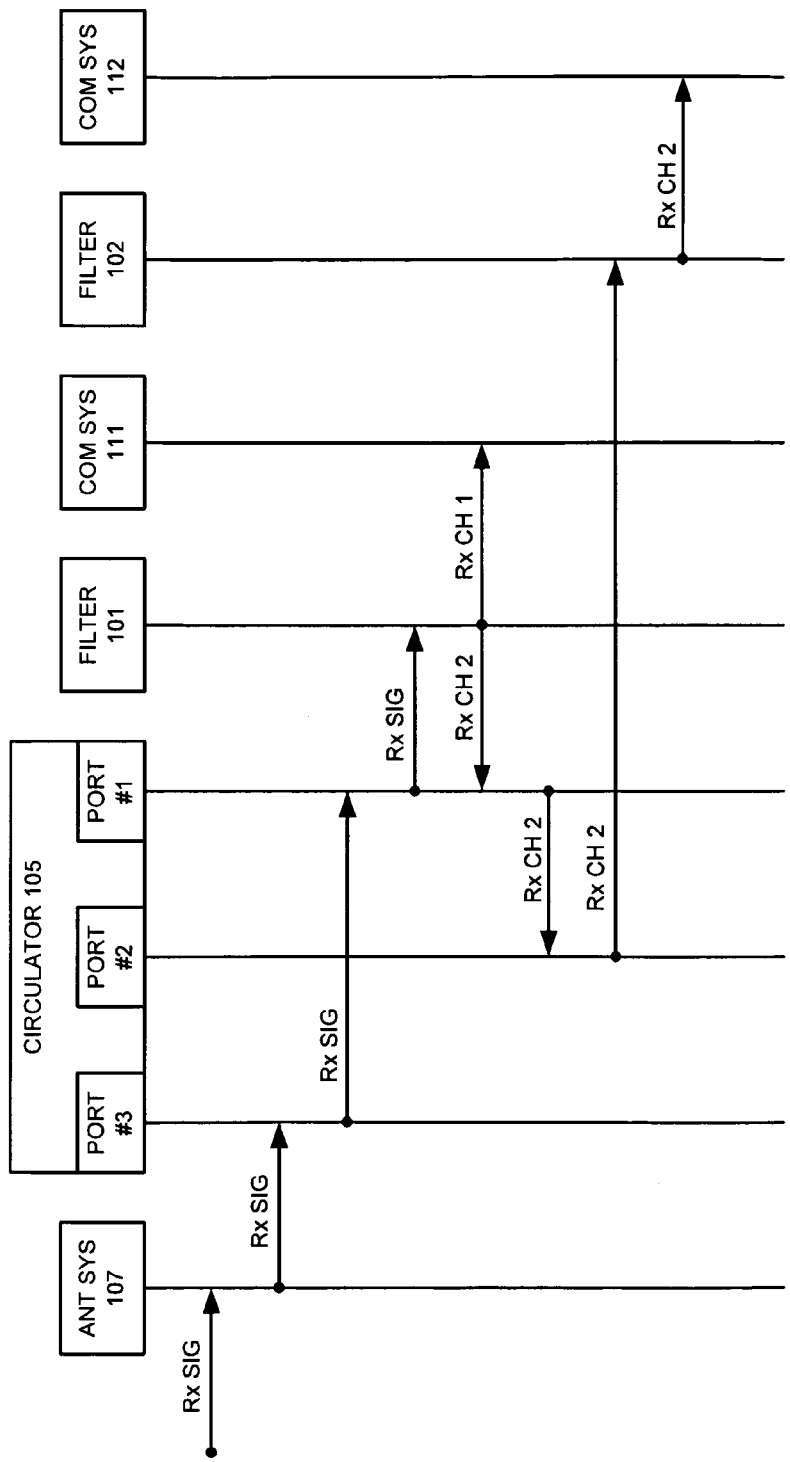
FIG. 2 illustrates the operation of a time-division communication system during a receive time period.

FIG. 2 illustrates the operation of time-division communication system 100 during a receive time period. In the receive time period, antenna system 107 wirelessly receives a receive communication signal over the air. The receive communication signal includes a first receive channel in the first frequency band and a second receive channel in the second frequency band. The receive communication signal may include additional channels, although that is not required.

Antenna system 107 transfers the receive communication signal to port 3 of circulator 105. Circulator 105 circulates the receive communication signal from port 3 to port 1. Port 1 of circulator 105 transfers the receive communication signal to filter 101. Filter 101 passes the first receive channel in the first frequency band and transfers the first receive channel to communication system 111. Filter 101 blocks the second receive channel in the second frequency band and reflects the second receive channel back to port 1 of circulator 105. Circulator 105 circulates the second receive channel from port 1 to port 2. Port 2 of circulator 105 transfers the second receive channel to filter 102. Filter 102 passes the second receive channel in the second frequency band and transfers the second receive channel to communication system 112.

Figure 3:
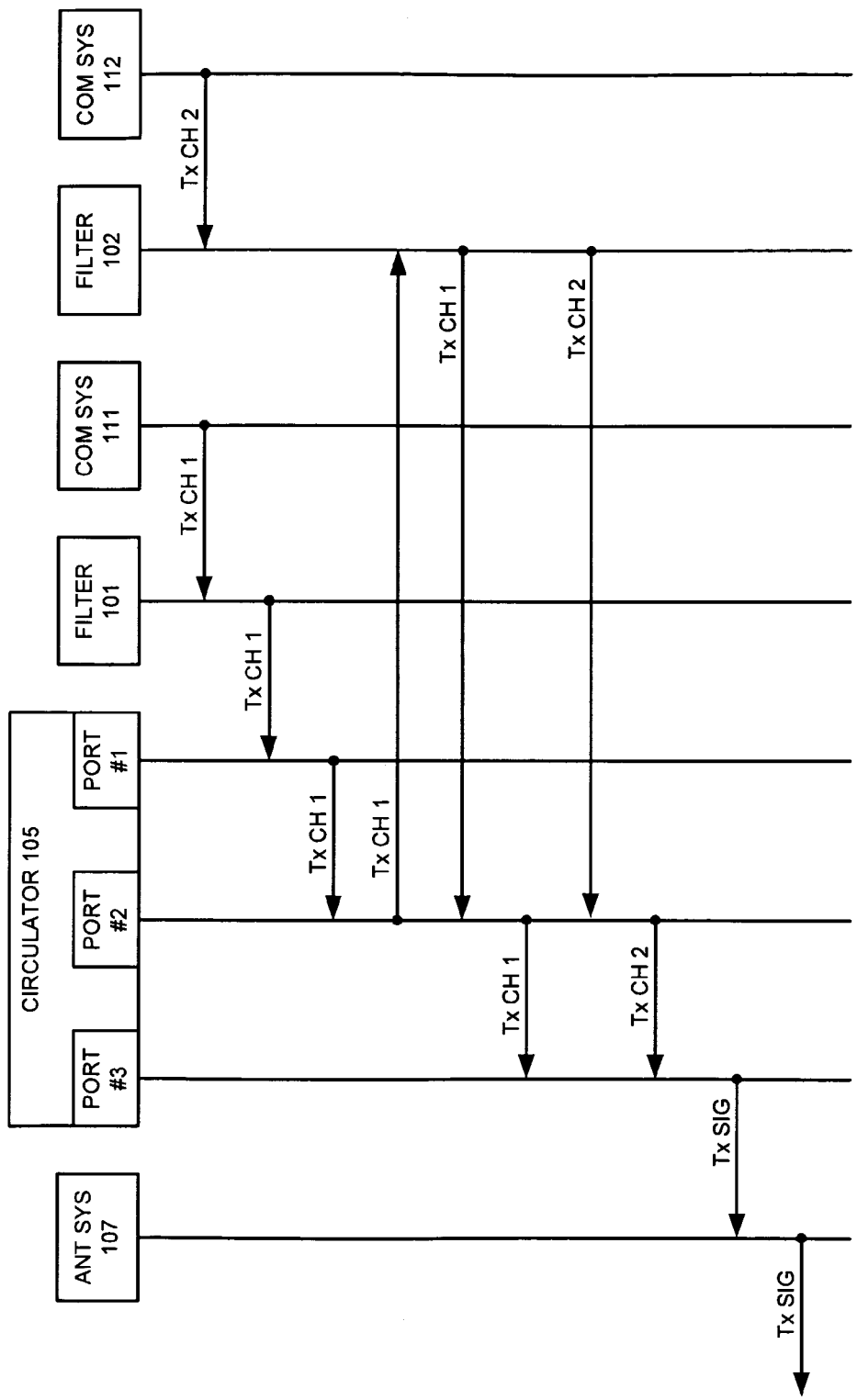
FIG. 3 illustrates the operation of a time-division communication system during a transmit time period.

FIG. 3 illustrates the operation of time-division communication system 100 during a transmit time period. In the transmit time period, communication system 111 transmits a first transmit channel in the first frequency band to filter 101, and communication system 112 transmits a second transmit channel in the second frequency band to filter 102. Note that the following operations with respect to the first and second transmit channels occur contemporaneously, although for clarity, the operations with respect to the first transmit channel are presented first.

Filter 101 passes the first transmit channel in the first frequency band and transfers the first transmit channel to port 1 of circulator 105. Circulator 105 circulates the first transmit channel from port 1 to port 2, and port 2 transfers the first transmit channel to filter 102. Filter 102 blocks the first transmit channel in the first frequency band and reflects the first transmit channel back to port 2 of circulator 105. Circulator 105 circulates the first transmit channel from port 2 to port 3.

As discussed above, filter 102 received the second transmit channel from communication system 112. Filter 102 passes the second transmit channel in the second frequency band and transfers the second transmit channel to port 2 of circulator 105. Circulator 105 circulates the second transmit channel from port 2 to port 3. Port 3 of circulator 105 transfers a transmit communication signal comprised of the first transmit channel and the second transmit channel to antenna system 107. Antenna system 107 wirelessly transmits the transmit communication signal over the air.

Example #2

Figure 4:
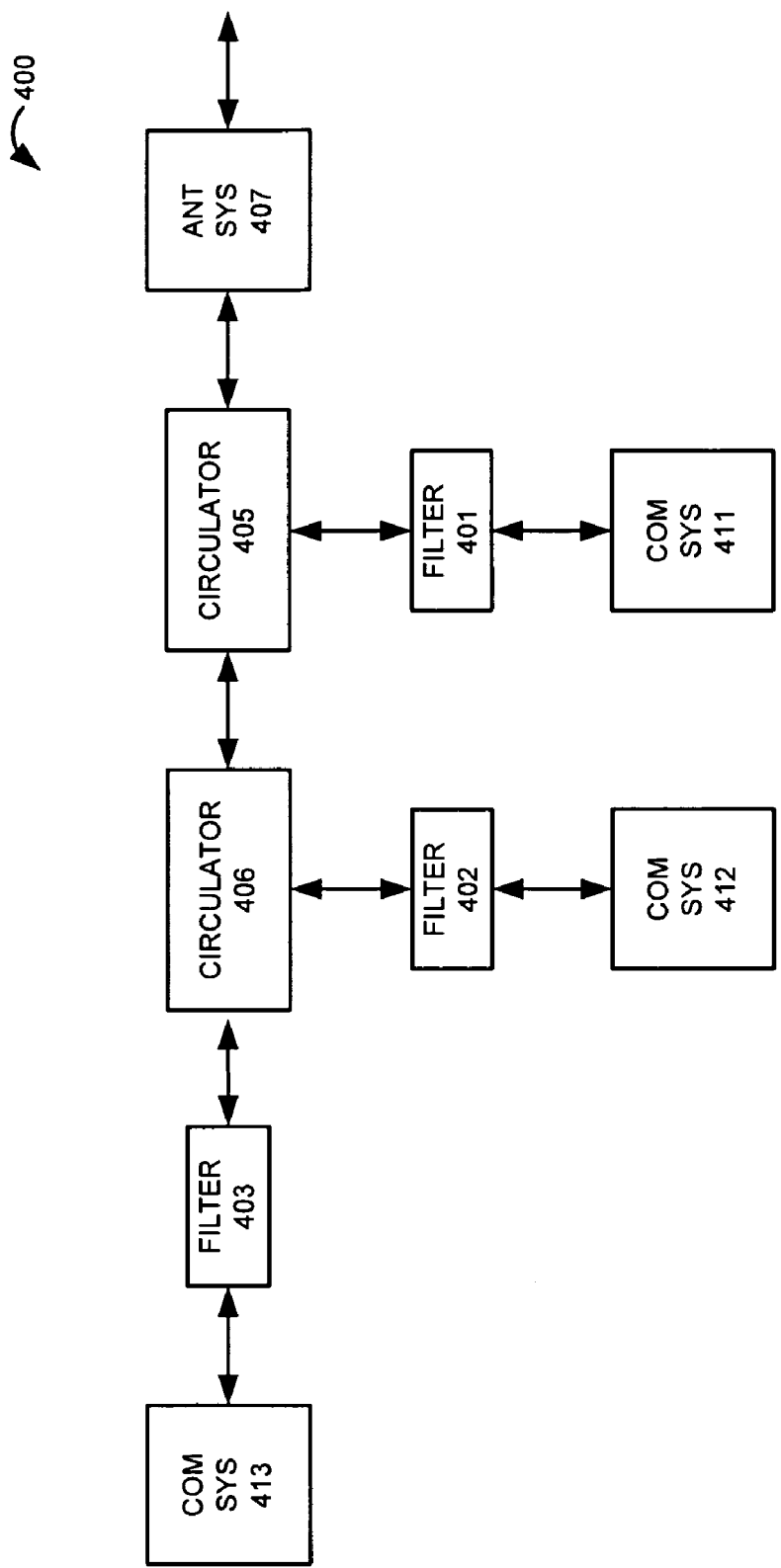
FIG. 4 is a block diagram that illustrates a time-division communication system.

FIG. 4 illustrates time-division communication system 400. Time-division communication system 400 comprises: filters 401-403, circulators 405-406, antenna system 407, and communication systems 411-413. For clarity, the circulator ports are not numbered on FIG. 4, but circulators 405-406 could have the same port configuration and operation as circulator 105 above. Communication system 411 is coupled to filter 401, and filter 401 is coupled to port 1 of circulator 405. Communication system 412 is coupled to filter 402, and filter 402 is coupled to port 1 of circulator 406. Communication system 413 is coupled to filter 403, and filter 403 is coupled to port 2 of circulator 406. Antenna system 407 is coupled to port 3 of circulator 405. Port 2 of circulator 405 is coupled to port 3 of circulator 406.

Filter 401 comprises a band-pass filter that passes signals in a first frequency band and that reflects signals in other frequency bands. Filter 402 comprises a band-pass filter that passes signals in a second frequency band and that reflects signals in other frequency bands. Filter 403 comprises a band-pass filter that passes signals in a third frequency band and that reflects signals in other frequency bands. The first frequency band and the second frequency band are non-adjacent frequency bands that are separated by another operational frequency band. The second frequency band and the third frequency band are adjacent frequency bands that are separated by a smaller unused guard frequency band. The first, second, and third frequency bands may comprise bands in the Broadband Radio Service (BRS) and/or Educational Broadband Service (EBS) spectrum. Other frequency spectrums authorized for Time Division Duplex or flexible use service may also use this technique.

Circulators 405-406 comprise magnetic circulators. Antenna system 407 comprises an antenna, band-pass filter, and low-noise amplifier. Communication system 411 transmits and receives signals in the first frequency band in a time-division mode that alternates between repeating receive and transmit time periods. Communication system 412 transmits and receives signals in the second frequency band in a time-division mode that alternates between repeating receive and transmit time periods. Communication system 413 transmits and receives signals in the third frequency band in a time-division mode that alternates between repeating receive and transmit time periods. Communication systems 411-413 share the same receive and transmit time periods, and thus, their respective receive channels must be separated and their respective transmit channels must be combined. Communication systems 411-413 may be integrated into a single base station.

Figure 5:
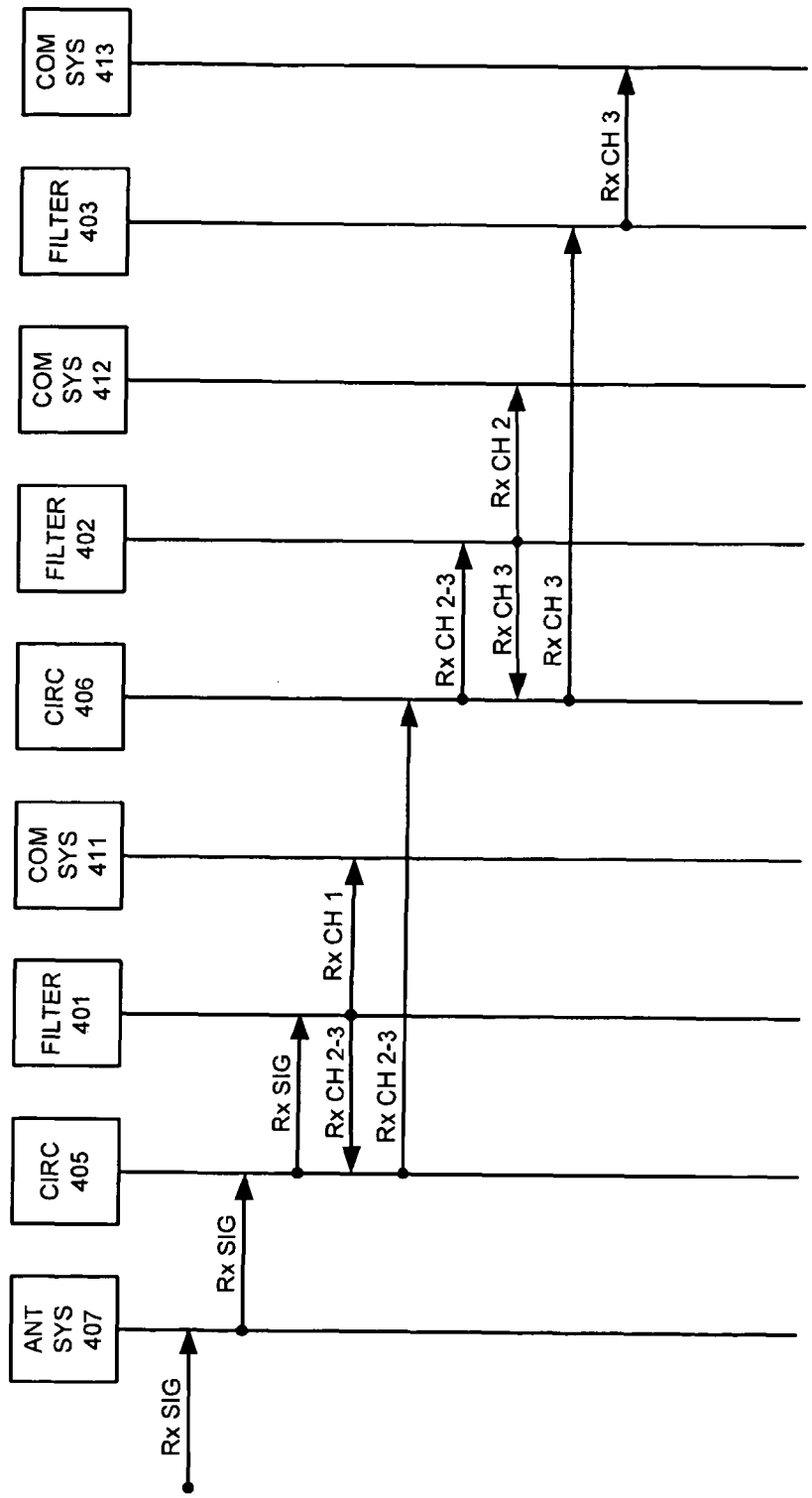
FIG. 5 illustrates the operation of a time-division communication system during a receive time period.

FIG. 5 illustrates the operation of time-division communication system 400 during a receive time period. In the receive time period, antenna system 407 wirelessly receives a receive communication signal over the air. The receive communication signal includes a first receive channel in the first frequency band, a second receive channel in the second frequency band, and third receive channel in the third frequency band.

Antenna system 407 transfers the receive communication signal to circulator 405. Circulator 405 circulates the receive communication signal to filter 401. Filter 401 passes the first receive channel in the first frequency band to communication system 411. Filter 401 reflects the second receive channel in the second frequency band and reflects the third receive channel in the third frequency band back to circulator 405. Circulator 405 circulates the second and third receive channels to circulator 406.

Circulator 406 circulates the second and third receive channels to filter 402. Filter 402 passes the second receive channel in the second frequency band to communication system 412. Filter 402 reflects the third receive channel in the third frequency band back to circulator 406. Circulator 406 circulates the third receive channel to filter 403. Filter 403 passes the third receive channel in the third frequency band to communication system 413.

Figure 6:
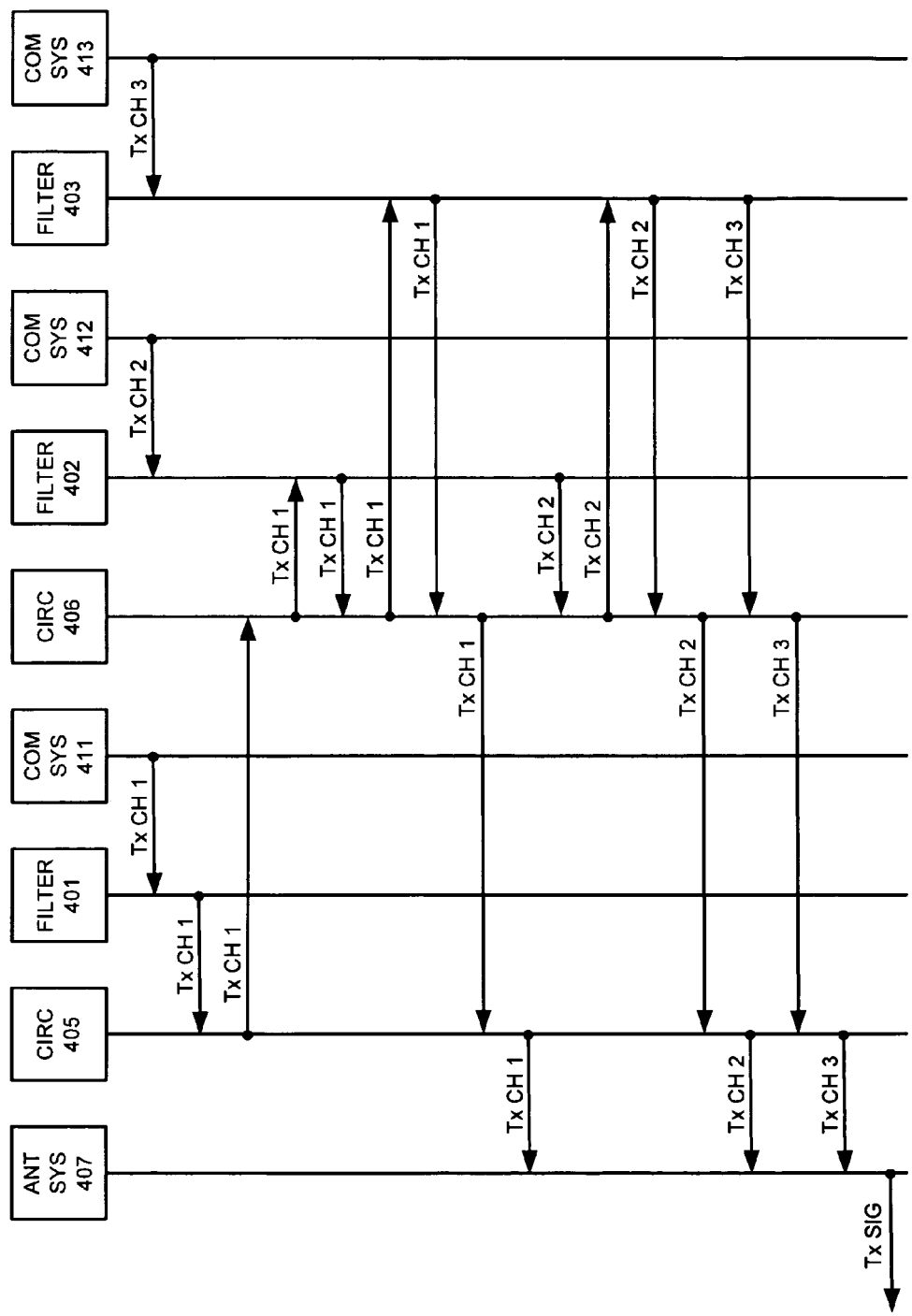
FIG. 6 illustrates the operation of a time-division communication system during a transmit time period.

FIG. 6 illustrates the operation of time-division communication system 400 during a transmit time period. In the transmit time period, communication system 411 transmits a first transmit channel in the first frequency band to filter 401, communication system 412 transmits a second transmit channel in the second frequency band to filter 402, and communication system 413 transmits a third transmit channel in the third frequency band to filter 403. Note that the following operations with respect to these transmit channels occur contemporaneously, but for clarity, the operations with respect to the transmit channels are presented one at a time.

Filter 401 passes the first transmit channel in the first frequency band to circulator 405. Circulator 405 circulates the first transmit channel to circulator 406. Circulator 406 circulates the first transmit channel to filter 402. Filter 402 reflects the first transmit channel in the first frequency band back to circulator 406. Circulator 406 circulates the first transmit channel to filter 403. Filter 403 reflects the first transmit channel in the first frequency band back to circulator 406. Circulator 406 circulates the first transmit channel to circulator 405. Circulator 405 circulates the first transmit channel to antenna system 407.

Filter 402 passes the second transmit channel in the second frequency band to circulator 406. Circulator 406 circulates the second transmit channel to filter 403. Filter 403 reflects the second transmit channel in the second frequency band back to circulator 406. Circulator 406 circulates the second transmit channel to circulator 405. Circulator 405 circulates the second transmit channel to antenna system 407.

Filter 403 passes the third transmit channel in the third frequency band to circulator 406. Circulator 406 circulates the third transmit channel to circulator 405. Circulator 405 circulates the third transmit channel to antenna system 407. Antenna system 407 wirelessly transmits a transmit communication signal comprising the first, second, and third transmit channels.

Note that system 400 effectively adds and additional circulator and filter to system 100 in order to support an additional transmit/receive channel. Additional circulators and filters could be added to system 400 in a similar manner to support additional transmit/receive channels. Thus, systems 100 and 400 efficiently combine and separate multiple frequency channels in a bi-directional time-division communication system.

What is claimed is:

1. A method of operating a time-division communication system that includes a first circulator having a first port, a second port, and a third port, the method comprising:
   in a receive time period, receiving a receive communication signal into the third port of the circulator, circulating the receive communication signal from the third port to the first port, transferring the receive communication signal from the first port to a first filter, transferring a first receive channel in the receive communication signal through the first filter for delivery to a first communication system, reflecting a second receive channel in the receive communication signal from the first filter to the first port, circulating the second receive channel from the first port to the second port, transferring the second receive channel from the second port for delivery to a second communication system; and
   in a transmit time period, transferring a first transmit channel received from the first communication system through the first filter to the first port, circulating the first transmit channel from the first port to the second port, transferring the first transmit channel from the second port and receiving the first transmit channel back into the second port, circulating the first transmit channel from the second port to the third port, receiving a second transmit channel into the second port, circulating the second transmit channel from the second port to the third port, and transmitting the first transmit channel and the second transmit channel from the third port to transmit a transmit communication signal from the first circulator.

2. The method of claim 1 further comprising:
   in the receive time period, transferring the second receive channel from the second port through a second circulator to a second filter for delivery to the second communication system; and
   in the transmit time period, transferring the first transmit channel from the second port through a second circulator to a second filter, reflecting the first transmit channel from the second filter through the second circulator to the second port, and transferring the second transmit channel received from the second communication system through the second filter and the second circulator to the second port.

3. The method of claim 2 further comprising:
   in the receive time period, transferring the first receive channel from the first filter to the first communication system and transferring the second receive channel from the second filter to the second communication system; and
   in the transmit time period, transferring the first transmit channel from the first communication system to the first filter and transferring the second transmit channel from the second communication system to the second filter.

4. The method of claim 1 further comprising:
   in the receive time period, transferring the first receive channel from the first filter to the first communication system; and
   in the transmit time period, transferring the first transmit channel from the first communication system to the first filter.

5. The method of claim 1 further comprising:
   in the transmit time period, transferring the first transmit channel from the second port to a second filter and reflecting the first transmit channel from the second filter to the second port.

6. The method of claim 5 further comprising:
   in the receive time period, transferring the second receive channel from the second port through the second filter to the second communication system; and
   in the transmit time period, transferring the second transmit channel from the second communication system through the second filter to the second port.

7. The method of claim 1 further comprising:
   in the receive time period, wirelessly receiving the receive communication signal into an antenna system and transferring the receive communication signal from the antenna system to the third port; and
   in the transmit time period, transferring the transmit communication signal from the third port to the antenna system and wirelessly transmitting the transmit communication signal from the antenna system.

8. The method of claim 1 wherein the first receive channel and the first transmit channel time-share a first frequency band and wherein the second receive channel and the second transmit channel time-share a second frequency band.

9. The method of claim 8 wherein the first frequency band and the second frequency band comprise non-adjacent frequency bands.

10. The method of claim 8 wherein the first frequency band and the second frequency band comprise adjacent frequency bands that are separated by an unused frequency band.

11. A time-division communication system comprising:
   a circulator comprising a first port, a second port, and a third port;
   a first filter coupled to the first port;
   a second filter coupled to the second port;
   an antenna system coupled to the third port;

a first communication system coupled to the first filter;
a second communication system coupled to the second filter; and wherein during a receive time period:

a receive communication signal is wirelessly received by the antenna system, transferred from the antenna system to the third port, circulated from the third port to the first port, and transferred from the first port to the first filter;

a first receive channel in the receive communication signal is transferred through the first filter to the first communication system; and a second receive channel in the receive communication signal is reflected from the first filter to the first port, circulated from the first port to the second port, and transferred from the second port through the second filter to the second communication system; and wherein during a transmit time period:

a first transmit channel is transferred from the first communication system through the first filter to the first port, circulated from the first port to the second port, transferred from the second port to the second filter, reflected from the second filter to the second port, circulated from the second port to the third port, and transmitted from the third port to the antenna system;

a second transmit channel is transferred from the second communication system through the second filter to the second port, circulated from the second port to the third port, and transmitted from the third port to the antenna system; and a transmit communication signal comprising the first transmit channel and the second transmit channel is wirelessly transmitted from the antenna system.

12. The time-division communication system of claim 11 wherein the first receive channel and the first transmit channel time-share a first frequency band and wherein the second receive channel and the second transmit channel time-share a second frequency band.

13. The time-division communication system of claim 12 wherein the first frequency band and the second frequency band comprise non-adjacent frequency bands.

14. The time-division communication system of claim 12 wherein the first frequency band and the second frequency band comprise adjacent frequency bands that are separated by an unused frequency band.

15. A time-division communication system comprising:

a first circulator comprising a first port, a second port, and a third port;

a first filter coupled to the first port;

a first communication system coupled to the first filter;

an antenna system coupled to the third port; and wherein during a receive time period:

a receive communication signal is wirelessly received by the antenna system, transferred from the antenna system to the third port, circulated from the third port to the first port, and transferred from the first port to the first filter;

a first receive channel in the receive communication signal is transferred through the first filter to the first communication system; and a second receive channel in the receive communication signal is reflected from the first filter to the first port, circulated from the first port to the second port, and transferred from the second port for delivery to a second communication system; and wherein during a transmit time period:

a first transmit channel is transferred from the first communication system through the first filter to the first port, circulated from the first port to the second port, transferred from the second port and received back into the second port, circulated from the second port to the third port, and transmitted from the third port to the antenna system;

a second transmit channel is received into the second port, circulated from the second port to the third port, and transmitted from the third port to the antenna system; and a transmit communication signal comprising the first transmit channel and the second transmit channel is wirelessly transmitted from the antenna system.

16. The time-division communication system of claim 15 further comprising:

a second circulator coupled to the second port;

a second filter coupled to the second circulator;

the second communication system coupled to the second filter; and wherein during the receive time period:

the second receive signal is transferred from the second port through the second circulator and the second filter to the second communication system; and wherein during the transmit time period:

the first transmit channel is transferred from the second port through the second circulator to the second filter and reflected from the second filter through the second circulator to the second port; and the second transmit channel is transferred from the second communication system through the second filter and the second circulator to the second port.

17. The time-division communication system of claim 15 further comprising:

a second filter coupled to the second port; and the second communication system coupled to the second filter; and wherein during the receive time period:

the second receive signal is transferred from the second port through the second filter to the second communication system; and wherein during the transmit time period:

the first transmit channel is transferred from the second port to the second filter and reflected from the second filter to the second port; and the second transmit channel is transferred from the second communication system through the second filter to the second port.

18. The time-division communication system of claim 15 wherein the first receive channel and the first transmit channel time-share a first frequency band and wherein the second receive channel and the second transmit channel time-share a second frequency band.

19. The time-division communication system of claim 18 wherein the first frequency band and the second frequency band comprise non-adjacent frequency bands.

20. The time-division communication system of claim 18 wherein the first frequency band and the second frequency band comprise adjacent frequency bands that are separated by an unused frequency band.

* * * * *